L. ZACHARA.
ELECTRIC SPECTACLE LAMP AND FRAME.
APPLICATION FILED APR. 12, 1916.
1,255,265.
Patented Feb. 5, 1918.
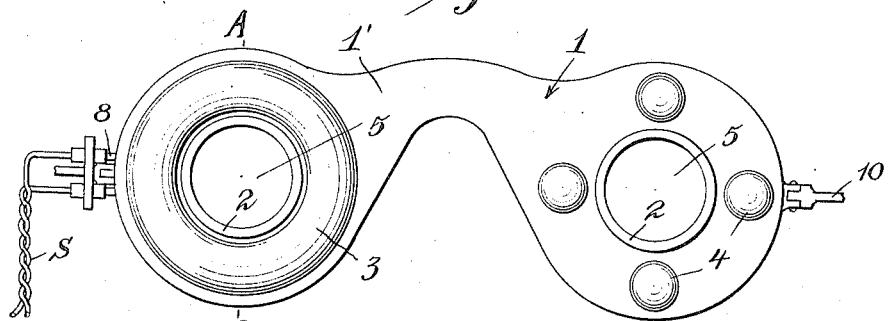
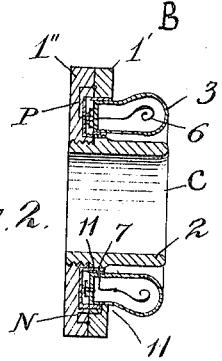
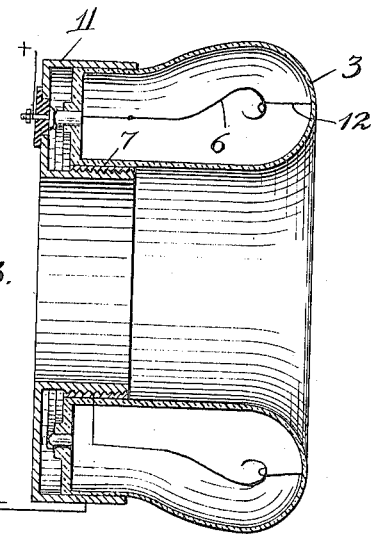
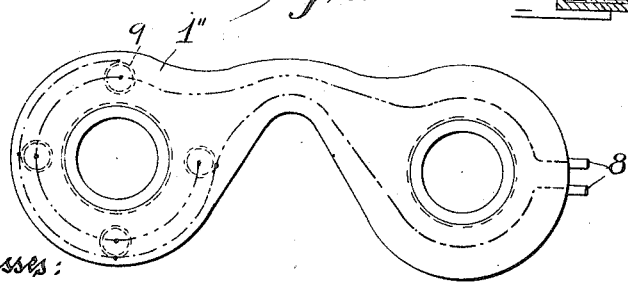
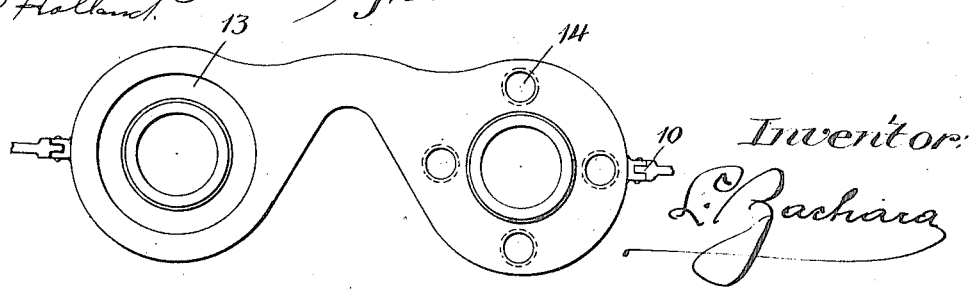
Witnesses:
D. Fradenburg.
P. Holland.
Inventor:
L. Zachara

UNITED STATES PATENT OFFICE.

LADISLAUS ZACHARA, OF SANDPOINT, IDAHO.

ELECTRIC SPECTACLE LAMP AND FRAME.

1,255,265.  Specification of Letters Patent.  Patented Feb. 5, 1918.

Application filed April 12, 1916. Serial No. 90,664.

*To all whom it may concern:*

Be it known that I, LADISLAUS ZACHARA, a citizen of the United States, residing at Sandpoint, in the county of Bonner and State of Idaho, have invented certain new and useful Improvements in Electric Spectacle Lamps and Frames; and I do hereby declare the following to be a full, clear, and exact description of the invention, such as will enable others skilled in the art to which it appertains to make and use the same.

My invention relates to new and useful improvements in electric spectacle lamp and frame, and my object is to provide means of bringing powerful electric light on a spectacle frame around the eye or eyes and forehead in order to exclude shadow from the side of the object where the object is wanted to be seen clearly, and both hands of the user will be free. The electric spectacle frame can be also converted into goggles with light provided.

A further object is to have an electric wiring system inside of a spectacle frame in any form in order to answer the wants of different uses. For instance, a hollow socket and a passage through the center of the lamps may be provided and a dark sleeve inside the passage of the lamp will enable the user to see the object clear. I have provided a cylindrical passage in the lamp which curves out on the point of the lamp. This curving can be shaped to any desired design.

A further object is to give the eyes protection from overstraining by means of limiting the view through openings in which dark tubings are mounted, these protecting the eyes from too much light rays, and the wide projecting frame catching the rays and throwing them back from the direction of the face and the spectacles can be worn by day also, just for resting the eyes.

Another object is to have a liberal number of detachable lamps or bulbs on the frame and on any place thereon, these being quickly exchanged to different sources of electricity. The bulbs can be equipped with small reflectors.

In the accompanying drawing Figure 1 is a front view of the spectacle frame and the attached lamps. Fig. 2 is a sectional view on the line A—B of Fig. 1. Fig. 3 is an enlarged sectional view of the spectacle lamp and its socket. In this Fig. 3 it can be seen that the spectacle lamp can be used for general lighting purposes, giving more light than single wall lamp of its size. Fig. 4 is a view of the rear half of the spectacle frame, and Fig. 5 is a view of the front half of the spectacle frame.

As shown by Figs. 1 and 2 of the drawings, the electric spectacle frame 1 comprises a front plate 1′ and a rear plate 1″. These plates have an arch therein for the nose of the wearer, and are provided with alined or concentric openings 5 for the eyes. A tube 2 of greater length than the thickness of the spectacle frame is threaded into each of the openings of the rear plate, extending through and beyond the opening in the front plate which opening is of larger diameter than the opening in the rear plate to provide a space for an annular socket 11, said socket having a bottom wall, and outside wall and a screw on the inside wall and a hole in the bottom wall, and between these outside and inside walls an opening in the bottom wall is left for insulated fixture to feed one of the poles of the hollow lamp in the center of the lamp base. The other pole is fed through the inside wall of the socket itself.

As shown on Fig. 1 of the drawing, an annular lamp having a central passage to receive tube 2 may be used on one side of the spectacle frame and individual lamp bulbs 4 placed around the tube 2 on the other side of the frame. It can be easily seen that the hollow lamps can be used also on both sides of the frame; and that a liberal number of individual lamp bulbs provided with small reflector can be also placed on any place of the spectacle frame, and supported through the opening 14, which opening has a screw feeding and supporting socket for the lamp bulb, a feeding wire supported by the said socket bringing the current to one of the poles, the other wire passes through center of the recesses 9 which recesses register with the opening 14, plates supported by the said wires forming contacts for the end terminal of the base of the lamp bulb.

To adjust the brightness of the light according to the weakness of the eyes the number of the lamps and their power may be varied. The aforesaid lamp 3 is of annular shape, having double walls between which is received the filament 6, and at its base is provided on its interior wall with a threaded cylinder or base screw to which one end of the filament is connected. Support 12 for filament 6 may be provided. The passage formed by the interior wall of the lamp 3 is of sufficient size to receive tube 2, when the base screw of the lamp is threaded into socket 11. On this rear plate 1″ of the spectacle frame 1, positive and negative wires P and N are provided as shown by Fig. 4 on the drawing. One of these wires is connected to the lamp socket 11, and the other wire is adapted to be connected with the base terminal through the opening in the bottom wall of socket 11. This opening has a flanged insulating plate on the outside of the socket bottom wall and insulating ring all around on the bottom wall on the inside, a headed contact pin on one and a screw with nut on the other, and passes through the center of the opening where the head of the pin makes contact with the base end of the lamp. The ends of wires P and N are connected to terminals 8, which are adapted to receive current from wires S.

The exterior of the tube 2 may have a mirror or reflecting surface to reflect light from the interior to the exterior of the lamp 3. If desired any kind of color or coloring may be applied to this surface to modify or tint the light rays.

When the spectacle frame is used the object is viewed through the passage C in each tube 2, the tubes 2 projecting the eyes from glare and the direct rays of light, while the lamps illuminate the object viewed so that it may be readily and clearly seen.

A support or band 10 holds the frame on the user.

From the description of my invention, it can be seen that its uses are many, as for instance, in automobiles, aviation, submarine operations, in trenches, professional and mechanical use and general use.

What I claim is:

1. A spectacle frame having an opening therethrough, through which an object may be viewed, a tube secured in this opening and extending beyond the spectacle frame, an annular socket located around this tube, means for supplying current to this socket, an annular lamp having base contacts fitting into this socket and a passage into which said tube extends.

2. A spectacle frame comprising front and rear plates, and having an opening in each of these plates in alinement, a tube extending through and beyond the opening in the front plate and secured at its rear end in the opening in the rear plate, an annular socket providing electrical contacts located around said tube, wiring between these two plates and connected to the socket contacts, an annular lamp having a base provided with contacts received in said socket, and a central passage into which said tube extends.

3. A lamp of annular shape having spaced exterior and interior walls, and a filament located therebetween, said interior wall being cylindrical and providing a passage through the lamp, a cylindrical base screw secured in this interior wall at its rear end and connected to one of the ends of the filament, a contact on the base of the lamp to which the other end of the filament is connected.

4. A spectacle frame comprising front and rear plates, said front having openings thereon throughout its own thickness to receive a liberal number of lamp bulbs, the rear plate having corresponding recesses with the front plate openings to receive the end of the base of the lamp bulb, a wiring passing through the center of said recesses having contact plates for the end terminal of the base of the lamp bulb.

LADISLAUS ZACHARA.

Witnesses:
IONE MARTIN,
W. M. HALLEMBACK.